(12) United States Patent
Hollemann et al.

(10) Patent No.: US 6,661,568 B2
(45) Date of Patent: Dec. 9, 2003

(54) DIODE-PUMPED LASER AMPLIFIER

(75) Inventors: Guenter Hollemann, Jena (DE); Jan Symanowski, Jena (DE)

(73) Assignee: Jenoptik Laser, Optik Systeme GmbH, Jena (DE)

( * ) Notice: Subject to any disclaimer, the term of this patent is extended or adjusted under 35 U.S.C. 154(b) by 25 days.

(21) Appl. No.: 09/939,401

(22) Filed: Aug. 24, 2001

(65) Prior Publication Data

US 2002/0036821 A1 Mar. 28, 2002

(30) Foreign Application Priority Data

Aug. 29, 2000  (DE) ......................................... 100 43 269

(51) Int. Cl.[7] ................................................. H01S 3/00
(52) U.S. Cl. ....................... 359/333; 359/342; 359/345; 359/346; 372/34; 372/69; 372/70; 372/71; 372/92; 372/98
(58) Field of Search ................................ 359/333, 342, 359/345–346; 372/34, 69, 71, 92, 98

(56) References Cited

U.S. PATENT DOCUMENTS

| | | | | |
|---|---|---|---|---|
| 5,103,457 A | * | 4/1992 | Wallace et al. ................ | 372/92 |
| 5,237,584 A | | 8/1993 | Shannon et al. .............. | 372/93 |
| 5,271,031 A | | 12/1993 | Baer ........................... | 372/93 |
| 5,561,547 A | | 10/1996 | Keirstead et al. ........... | 359/288 |
| 5,627,853 A | * | 5/1997 | Mooradian et al. ........... | 372/92 |
| 5,682,397 A | * | 10/1997 | Scheps ........................ | 372/22 |
| 5,696,786 A | | 12/1997 | Durkin et al. ................ | 372/75 |
| 5,699,376 A | * | 12/1997 | Richmond .................... | 372/68 |
| 5,737,347 A | * | 4/1998 | Scheps et al. ................ | 372/23 |
| 5,757,842 A | * | 5/1998 | LaPlante et al. ............. | 372/98 |
| 5,875,160 A | * | 2/1999 | Harigaya et al. ........ | 369/44.27 |
| 6,022,114 A | * | 2/2000 | Foo ............................ | 359/853 |
| 6,115,402 A | * | 9/2000 | Caprara ...................... | 372/101 |
| 6,141,143 A | * | 10/2000 | Marshall ..................... | 359/342 |
| 6,417,955 B1 | * | 7/2002 | Kafka et al. ................. | 359/333 |

FOREIGN PATENT DOCUMENTS

DE    198 45 786 A1 *  5/2000

OTHER PUBLICATIONS

Frauchiger et al. "Modeling of Thermal Lensing and Higher Order Ring Mode Oscillation in End–Pumped CW Nd:YAG Lasers." J. Quantum Elect. 28:4, Apr. 1992, pp. 1046–56.*
Pfistner et al. "Thermal Beam Distortions in End–Pumped Nd:Yag, Nd:GSGG, and Nd:YLF Rods," J. Quantum Elect. 30:7, Jul. 1994, pp. 1605–1615.*
Zavelani–Rossi et al. "Control of thermal effects for high–intensity Ti:sapphire chains." Appl. Phys. B [Suppl.], S193–S196 May 2000.*
FFI Rapport Thermal Effects in End–Pumped Solid State Lasers–Influence on Resonator Stability, Beam Quality, and Output Power (Jul. 30, 2001).*
Aus der Au et al. "Femtosecond diode–pumped Nd:glass laser with more than 1 W of average output power." Optics Lett. 23: Feb. 1998, pp. 271–273.*
Tidwell et al. "Scaling CW Diode–End–Pumped Nd:YAG Lasers to High Average Powers" J. Quantum Elect. 28:4, Apr. 1992, pp. 997–1009.*

(List continued on next page.)

Primary Examiner—Thomas G. Black
Assistant Examiner—Stephen Cunningham
(74) Attorney, Agent, or Firm—Reed Smith LLP (57) ABSTRACT

In a diode-pumped laser amplifier the inventive object is to increase the tolerance of the amplifier arrangement relative to variations of the input parameters significantly, so that fine-tuning is no longer necessary for guaranteeing the stability of the amplifier. Into a laser-active solid-state medium where a thermal lens of a strength which is different in orthogonal planes is generated in consequence of the irradiated pump radiation, a laser beam to be amplified is directed into the laser-active solid-state medium while being focused in the plane with a strong thermal lens, wherein a beam waist that is being generated lies in the area of the thermal lens. The laser amplifier can be used for amplifying the radiation of an oscillator.

16 Claims, 5 Drawing Sheets

OTHER PUBLICATIONS

Paschotta et al. "Diode–pumped passively mode–locked lasers with high average power." Appl. Phys. B 70 [suppl.], S25–31, May 2000.*

Neuenschwander et al. "Thermal Lens and Beam Properties in Multiple Longitudinally Diode LAser Pumped Nd:YAG Slab Lasers" J. Quantum Elect. 32:3, Mar. 1996, pp. 365–370.*

Zhang Guang–Yin et al. "A Solid State Laser Resonator Capable of Compensating Thermal Lens Effect Adaptivley," Acta Physica Sinica 49:8, Aug. 2000, pp. 1495–1498 (in Chinese with English Abstract).*

Plaessmann et al. "Multipass diode–pumped solid–state optical amplifier." Optics Letters 18:17, Sep. 1993, pp. 1420–1422.*

Schmid et al. "Numerical Simulation and Analytical Description of Thermally Induced Birefringence in Laser Rods." J. Quantum Elect. 36:5, May 2000, pp. 620–626.*

Mudge et al. "Power Scalable TEM00 CW Nd:YAG Laser with Thermal Lens Compensation." J. Selected Topics in Quantum Elect. 6:4, Jul./Aug. 2000, pp. 643–649.*

* cited by examiner

DIODE-PUMPED LASER AMPLIFIER

CROSS-REFERENCE TO RELATED APPLICATION

This application claims priority of German Application No. 100 43 269.7, filed Aug. 29, 2000, the complete disclosure of which is hereby incorporated by reference.

BACKGROUND OF THE INVENTION a) Field of the Invention

The invention is directed to a diode-pumped laser amplifier with at least one laser-active solid-state medium which is permeated by the mode matched beams of a pump radiation and laser radiation to be amplified and in which a thermal lens forms because of the irradiating pump radiation whose lens strength is different in orthogonal planes.

b) Description of the Related Art

It is known that in the field of solid-state lasers fundamental mode oscillators can only be scaled up to a certain output power because of the optothermal properties of the laser-active media that are being used. For the generation of a high power output, oscillators are therefore often combined with laser amplifiers arranged behind them in the beam path with which the high quality of the beam of the oscillator radiation can be maintained.

Such an oscillator-amplifier arrangement also has the advantage of making it possible to intentionally run an oscillator at relatively low power. In the case of a mode locked short pulse laser, this means that a saturable semiconductor absorber arranged inside a resonator can thus be protected from overloading.

Known arrangements, like, for example, the one according to U.S. Pat. No. 5,237,584, have the disadvantage of having a high adjusting sensitivity. The oscillator output radiation is supplied mode matched to the multi-stage amplifier. The amplifier contains diode-pumped laser crystals with folding mirrors arranged opposite. To compensate for the strong thermal lenses forming in the crystals, a highly precise tuning of the radii of curvature of the mirrors and of their distances to the laser crystals is necessary; otherwise, a stable optical system can not be guaranteed. One serious disadvantage of these serial set-ups is the fact that individual component variations must be adjusted for over and over again. Small changes, like, for example, variations of the diode parameters caused by aging or other things, as well as component variations of the crystals, already lead to a system breakdown because of the very narrow tolerances.

The named disadvantages are even more marked in a laser system according to U.S. Pat. No. 5,696,786, since intermediate imaging elements are not used here and an opportunity for adapting the beam path with regards to the thermal lenses therefore does not exist. Such laser arrangements typically only have small operating windows when it comes to diode currents.

Alternatively, the folded beam path can also be realized in a crystal (U.S. Pat. No. 5,271,031) by consecutively going through different pumped areas of this crystal a number of times. This arrangement also has the disadvantages of U.S. Pat. No. 5,696,786.

Finally, from a longitudinally pumped solid-state laser arrangement according to DE 195 21 943, the fact is known that convex toric or cylindrical lenses can be generated spontaneously and uncontrollably by an elongated pump spot because of the isothermal field which builds up in the laser crystal and is shaped like relatively flat ellipses.

OBJECT AND SUMMARY OF THE INVENTION

It is the primary object of the invention to increase the tolerance of the amplifier arrangement towards variations of the input parameters considerably so that fine-tuning to guarantee the stability of the amplifier is no longer necessary.

This object is met by a diode-pumped laser amplifier with at least one laser-active solid-state medium which is permeated by mode matched rays of pump radiation and laser radiation to be amplified, and in which a thermal lens is formed because of the irradiating pump radiation whose lens strength is different in orthogonal planes, and by directing the beam of the laser radiation into the laser-active solid-state medium focussed in the plane with a strong thermal lens, with the beam waist that is created lying in the area of the thermal lens.

For the creation of the beam waist, a focussing element like, for example, a cylindrical lens focusing in the plane of the strong thermal lens is used which is arranged in the beam path of the laser radiation at a distance to the location of the thermal lens corresponding to the element's focal length.

Since the distance to be established between the cylindrical lens and the laser-active medium is not a function of the thermal lens, setting the distance at the nominal focal length once is sufficient. Individual thermal lenses, like those to be found in laser-active solid-state media for amplifiers with multiple amplifier stages, no longer have to be taken into consideration when it comes to establishing a stable system. It has become evident that a thermal lens located in the area of a beam waist does not influence beam propagation. Contrary to prior art solutions where the influence of thermal lens effects on the beam path must be compensated for by highly sensitive adjustments, in the invention the effect of thermal lenses has already been practically removed by the amplifier configuration. The laser beam undergoes a mode matching that is independent in planes with thermal lenses of differing strength. Since by this the amplification, beam quality and beam parameters of the amplifier are also insensitive to variations of the diode parameters, the pump diodes realized as laser diode arrays can be operated in series in the electrical sense and at the same temperature. In contrast to prior art solutions, different thermal lenses caused by different individual diode laser characteristics and spectral properties also lose their effect and therefore do not need to be compensated for with complicated adjustments.

Using the invention, a compact and inexpensive amplifier can be constructed whose number of strictly modular amplifier stages is scalable since the output of each amplifier stage—with the exception of an end stage—forms the input of a subsequent amplifier stage. This provides an amplifier arrangement for which wide production tolerances of the necessary simple standard components are admissible and which still only has a very low variation of the amplifier.

With the arrangement, the radiation of low-power oscillators with a mode locked operating mode can be amplified while maintaining the beam quality defined by the oscillator and determined by the times-diffraction-limit number $M^2$. The construction of a serial amplifier with a high degree of stability and reproducibility has been achieved. Furthermore, the use of the invention avoids having to use price-increasing beam shaping optics for the pump diodes which decrease effectivity and with which normally a rearrangement in the sense of a symmetrization of the beam parameter products for the fast and the slow axis of the diode is done.

Advantageously, at least one laser diode array is used as the pump radiation source for which means for the collimation of the fast axis and means for focusing the diode radiation in the elliptical pump focus for the generation of the thermal lens formed with different strengths in orthogonal planes are provided.

For the improvement of the beam quality of the laser diode array, an additional collimation of the slow axis can also be advantageous.

For setting the polarization, a half-wave phase plate can be provided.

The pump radiation and the laser radiation are directed into the solid-state medium through beam passage surfaces lying opposite to each other. Since the beam passage surface for the pump radiation is highly reflective for the wavelength of the laser radiation, the laser radiation after being reflected again passes through the laser-active solid-state medium and the focusing element.

An optical element for the expansion of the laser beam in the plane where the thermal lens is weak arranged on the input side of the amplifier can be realized as a Galilean telescope with cylindrical lenses or as an anamorphotic prism pair.

It is advantageous if at least one image forming element is provided in the beam path of the laser radiation for the purpose of compensating the weak thermal lens in the one plane. This can either be a cylindrical mirror realized as folding mirror or a spherical mirror; alternatively, a convex cylindrical lens with a long focus length or a spherical lens with a long focus length can be arranged in the beam path of the laser beam emerging from the laser-active solid-state medium.

A Nd.YVO$_4$ crystal with a doping level of 0.5% can be used as the laser-active solid-state medium and pumped at a wavelength in the range from 803 nm to 809 nm.

The invention is subsequently to be described in more detail using the schematic drawings.

DESCRIPTION OF THE PREFERRED EMBODIMENTS

Figure 1:
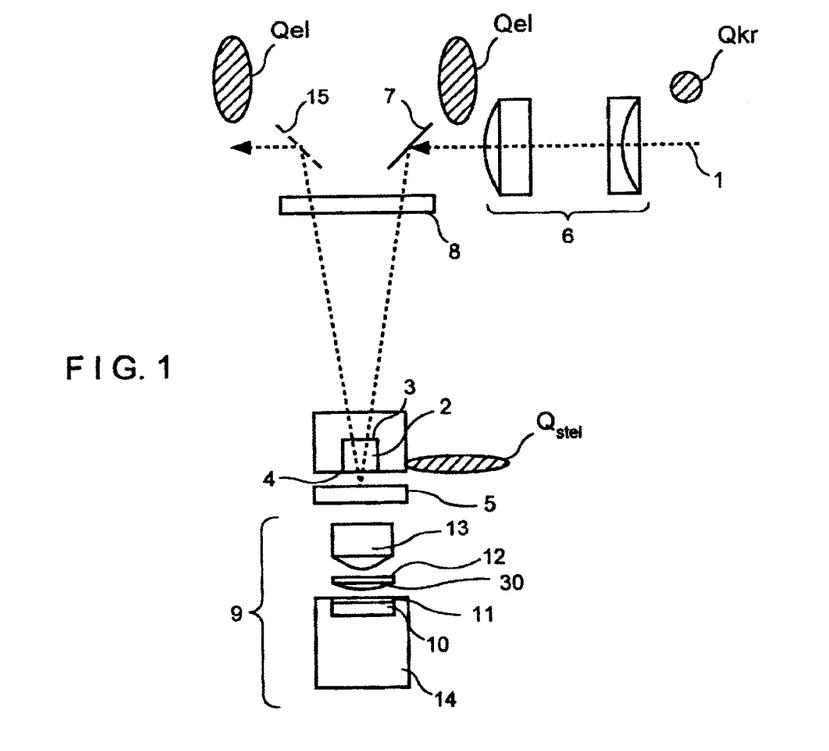
FIG. 1 shows the construction of an amplifier module.

The amplifier module shown in FIG. 1 is used for the amplification of laser radiation, in particular of a collimated laser beam 1 generated by an oscillator (not shown) which in the present embodiment example has a circular beam cross-section $Q_{kr}$.

A laser-active solid-state medium realized as a laser crystal has two opposing beam passage surfaces 3, 4 of which one is arranged directly adjacent to a pump mirror 5. The pump mirror 5 which can also be constructed as a surface coating of the beam passage surface 4 is permeable for the pump wavelength and highly reflective for the wavelength of the laser radiation. The optically active beam passage surface 3 can have an anti-reflection coating for the pump wavelength and the laser wavelength in normal incidence. The required pump wavelength for the laser crystal 2 preferably realized as a Nd:YVO$_4$ crystal with a doping level of, for example, 0.5% lies between 803 nm and 809 nm. For the present embodiment example, crystals with measurements of 1×4×4 mm$^3$ are suitable. Other crystals doped with rare earth elements apart from Nd:YVO$_4$ crystals can also be used.

Figure 2:
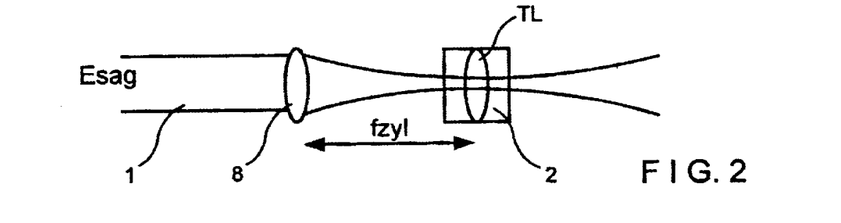
FIG. 2 shows the beam path in the amplifier module in the sagittal plane.
Figure 3:
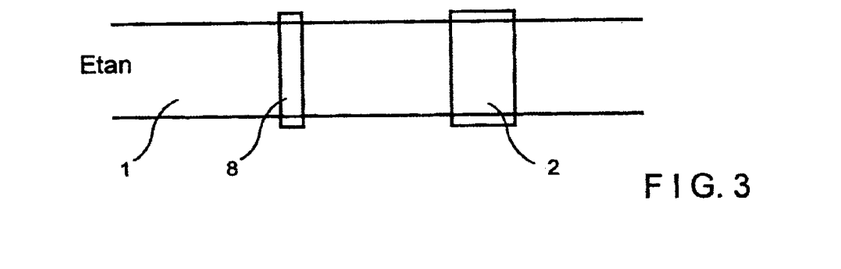
FIG. 3 shows the beam path in the amplifier module in the tangential plane.

The irradiated laser beam 1 is first expanded in a first plane, the tangential plane $E_{tan}$, by means of a Galilean cylindrical lens telescope 6 into an elliptical beam cross-section $Q_{el}$ with a low semiaxis ratio (expansion by a factor of 2 to 3) corresponding to the magnification factor or the telescope 6. Alternatively, an anamorphotic prism pair can be used for this purpose. If the oscillator already supplies an elliptical laser beam, it goes without saying that in that case the beam shaping on the input side is not necessary. A first folding mirror 7 arranged further down the beam path directs the laser beam 1 through a cylindrical lens 8 which focuses the collimated laser beam 1 in the sagittal plane $E_{sag}$, into the laser crystal 2. The laser beam 1 still collimated in the tangential plane $E_{tan}$ (FIG. 3) permeates the laser crystal 2 mode matched to the pump beam with a strongly elliptical focus $Q_{stel}$. The cylindrical lens 8 is arranged at a distance to the thermal lens TL formed in the laser crystal 2 which corresponds to its focal length $f_{zyl}$ so that the resulting beam waist lies in the area of said thermal lens (FIG. 2).

After its second passage through the cylindrical lens 8, the laser beam 1 reflected by the pump mirror 5 is collimated in the sagittal plane again and has the same elliptical cross-section as before the first passage through the cylindrical lens 8.

A diode laser module 9 is provided for the generation of the pump beam and contains in a sealed housing (not shown) at least one laser diode array 10 with collimating optics 11 for the fast axis, an optional half-wave phase delay plate 12 for setting the polarization and an aspherical lens 13 for focusing the pump beam into the laser crystal 2. The optional collimation of the slow axis for the improvement of the beam quality of the laser diode array 10 is shown at 30 in FIG. 1. It is furthermore also possible to use a spherical lens or a lens arrangement instead of the aspherical lens 13.

The housing protects the module elements from dust, moisture, chemical fumes, electrostatic discharges and mechanical damage. The laser diode array 10 is attached to a copper body 14 serving as a heat sink by means of suitable mounting techniques.

The pump beam generated by these means is strongly elliptical like the laser beam 1, wherein the beam cross-section within the laser crystal 2 pumped quasi-longitudinally is characterized by its extension in the sagittal plane of, for example, 1 μm to 500 μm and in the tangential plane of, for example, 0.5 mm to 3 mm. Such an elliptical pump beam generates a thermal lens in the laser crystal 2 which has different strengths in the orthogonal planes $E_{sag}$ and $E_{tan}$ because of the temperature gradient which differs directionally. Thus, the focal lengths of the thermal lens can be in the range of 40 mm to 200 mm in the sagittal plane $E_{sag}$ in which the fast axis of the laser diode array is also located, and in the range of 1000 mm to 4000 mm in the tangential plane $E_{tan}$. Because of its great focal length, the thermal lens in the tangential plane $E_{tan}$ has hardly any interfering imaging function with regards to the laser beam 1 to be amplified. With an increasing focal length, this effect can be practically excluded.

A weak residual effect of the thermal lens in the tangential plane $E_{tan}$ can also be compensated for in a simple manner by additional imaging elements arranged in the amplifier module, like, for example, by a cylindrical lens with a long focal length or a spherical lens, or also by a particular design of elements already present. For this, a second folding mirror 15 arranged in the beam path on the output of the amplifier module can be used with which the laser beam 1 can, for example, be supplied to a next amplifier stage by means of reflection. For this purpose, the folding mirror 15 (drawn with dashed lines) needs to be of a cylindrical or of a convex spherical shape and, if necessary, to be tilted correspondingly. For the use of spherical mirrors, the influence on beams in the sagittal plane $E_{sag}$ is very small because of the great radii of curvature; this can be seen in FIG. 5. The same is true for the spherical lenses with a long focal length, since in the sagittal plane $E_{sag}$ only lenses of a short focal length determine the imaging. In each case, an independent adaptation of the modes in the tangential plane $E_{tan}$ is possible via the setting of the lens distance in the cylindrical lens telescope 6.

If a correction of the vestigial effect of the thermal lens TL in the tangential plane $E_{tan}$ is not required or done by correcting lenses, the second folding mirror can also be constructed as a plane mirror.

Figure 4:
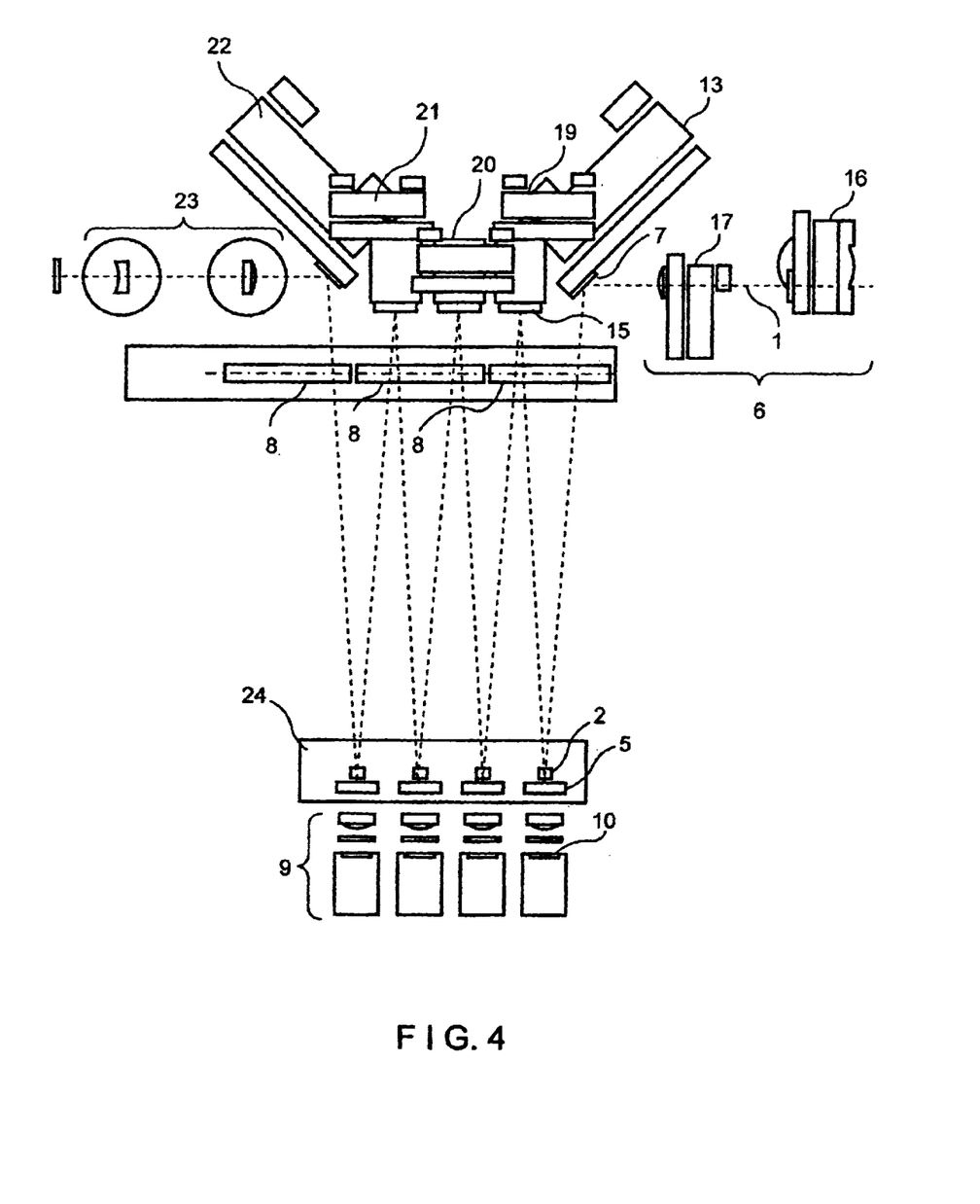
FIG. 4 shows a four-stage amplifier consisting of four amplifier modules.

The multi-stage amplifier shown in FIG. 4 contains amplifier modules whose number is adapted to the number of amplifier stages and the elements of which have the same references as those in FIG. 1. The diode laser module 9 assigned to the laser crystals 2 form the pump arrangement for the amplifier. Preferably, the individual laser diode arrays 10 are operated electrically in series and at the same diode temperature.

The laser crystal 2 provided per amplifier stage can also be assigned several laser diode arrays 10, but arrangements with several laser crystals per laser diode array can also be envisaged.

The means of adjustment 16 to 22 provided for the imaging elements are used for establishing an adjusted state of the amplifier. Since this state as well as the distance between the cylindrical lens 8 and the thermal lens determined by the focal length $f_{zyl}$ are independent of the size of the strong thermal lens in the sagittal plane $E_{sag}$, further adaptations, in particular upon a change of the diode current, are not necessary.

While the mode matching in FIG. 1 is only done on the input side of the amplifier module with the aid of a cylindrical lens, based on the symmetry of the arrangement, a suitable mode matching in the shape of a cylindrical lens telescope 23 can also be provided on the output, so that beams which are symmetrical to each other are created on the input and output. The laser crystals 2 (operated far below their breaking point) are attached to a heat sink 23 by means of suitable mounting techniques, like soldering, gluing or by being pressed into indium.

Figure 5:
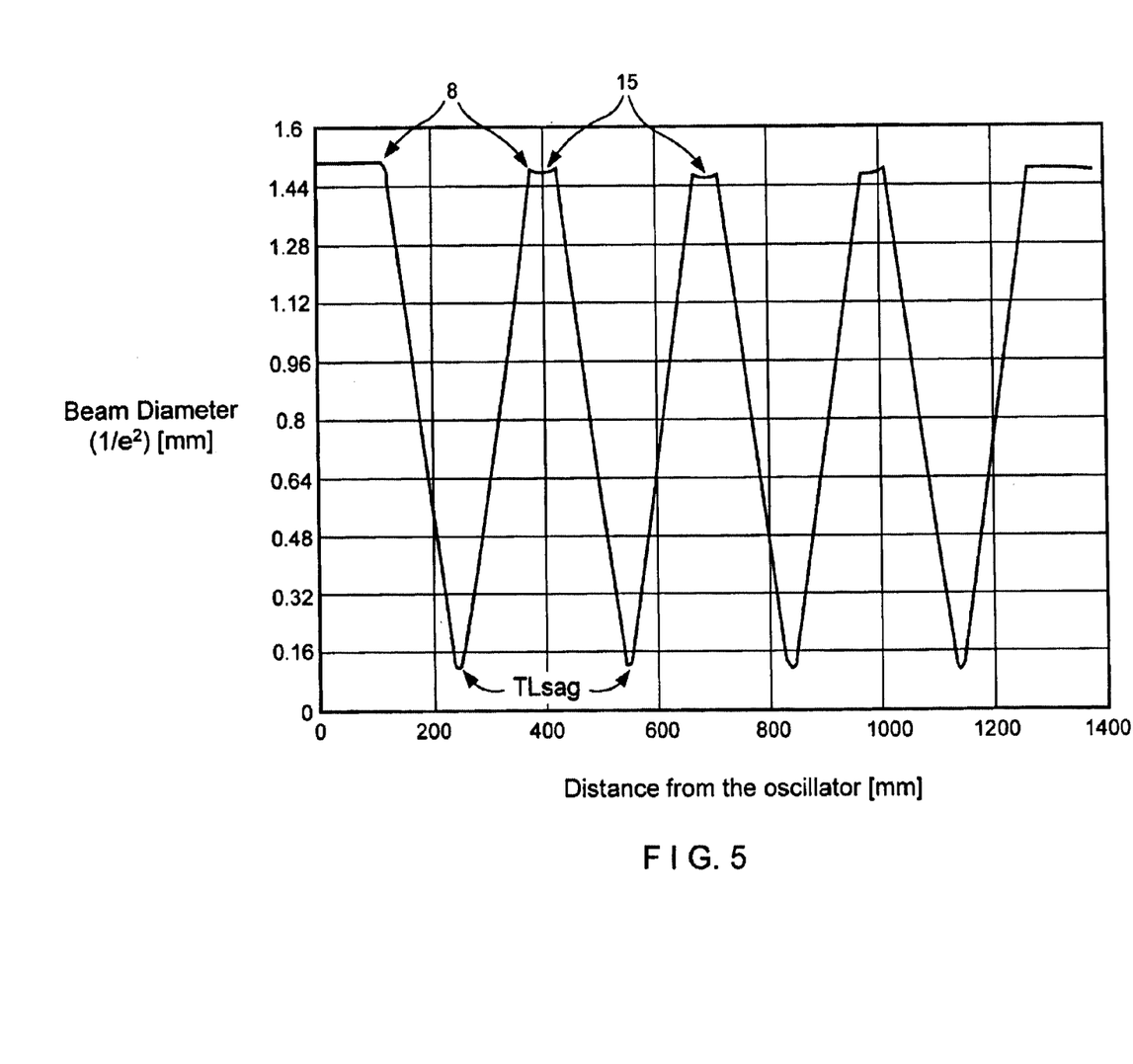
FIG. 5 shows the profile of the beam diameter in an amplifier according to FIG. 4 in the sagittal plane.
Figure 6:
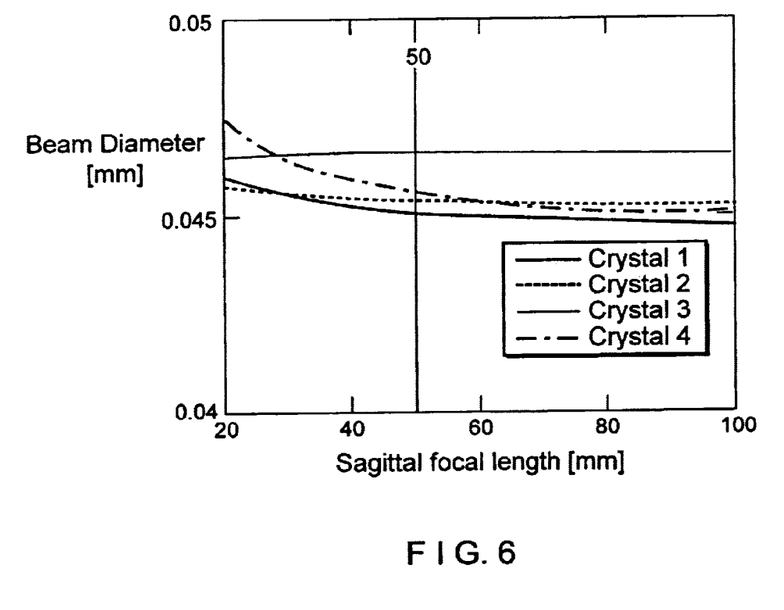
FIG. 6 shows the beam diameter in the laser crystals of the amplifier according to FIG. 4 as it depends on the strength of the thermal lens in the sagittal plane.
Figure 7:
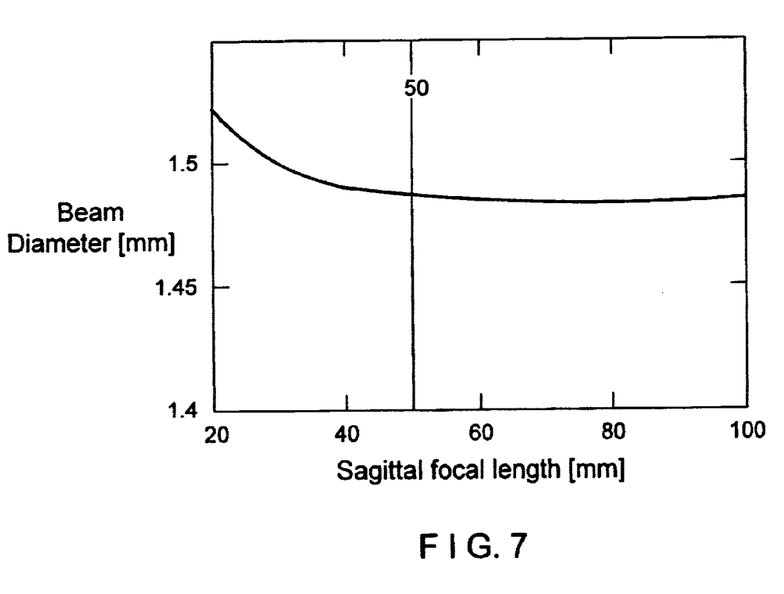
FIG. 7 shows the beam diameter on the amplifier output of the amplifier according to FIG. 4 as it depends on the strength of the thermal lens in the sagittal plane.

The multi-stage amplifier according to FIG. 4 has the beam characteristics shown in FIGS. 5 to 8. Depending on the distance to the oscillator (not shown), the beam diameter of the laser beam 1 in the sagittal plane $E_{sag}$ is mainly determined by the effect that the cylinder lenses 8 have (FIG. 5). The stronger the effect of the cylindrical lenses 8, the less the effect of system fluctuations. The influence of the convex spherical folding mirrors 15 is sufficiently corrected by the high focal length ratio between the long focal lengths of the mirrors in the tangential plane $E_{tan}$ and the short focal lengths of the cylindrical lenses 9 in the sagittal plane $E_{sag}$. The thermal lenses $TL_{sag}$ which are strong in the sagittal plane do not interfere with the beam propagation in the laser crystal 2 (FIG. 6) and on the output of the amplifier (FIG. 7). In both cases, a change of the focal length of the strong thermal lenses $TL_{sag}$ only goes with a minute variation of the beam diameters.

Figure 8:
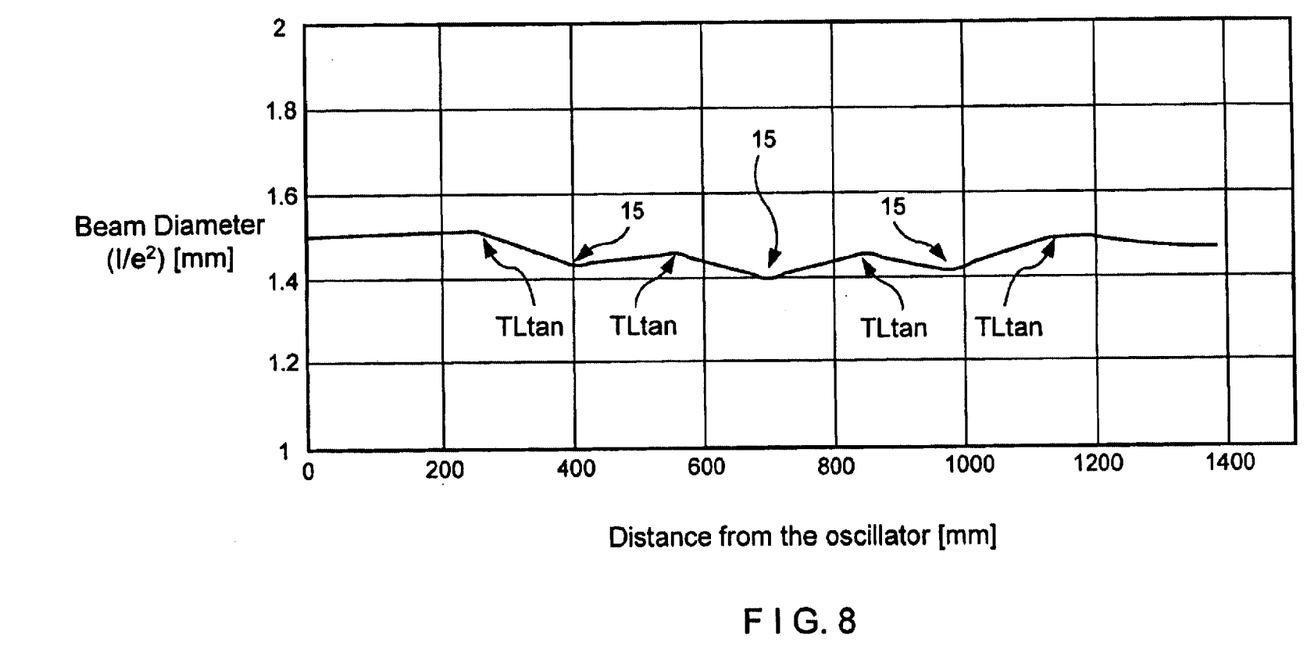
FIG. 8 shows the profile of the beam diameter in the amplifier according to FIG. 4 in the tangential plane.

According to FIG. 8, the laser beam 1 expanded in the tangential plane $E_{tan}$ by a cylindrical lens telescope 6 passes through weak thermal lenses $TL_{tan}$ while being corrected using the convex spherical folding mirrors. A symmetrization is done on the amplifier output using the cylindrical lens telescope 23. It must be noted that in the tangential plane $E_{tan}$ the much lower pump beam quality of the slow axis is having an effect.

While the foregoing description and drawings represent the present invention, it will be obvious to those skilled in the art that various changes may be made therein without departing from the true spirit and cope of the present invention.

What is claimed is:

1. A diode-pumped laser amplifier comprising:
   at least one laser-active solid-state medium which is permeated by mode matched beams of pump radiation and laser radiation to be amplified and in which a thermal lens forms because of the irradiating pump radiation whose lens strength is different in orthogonal planes;
   said beam of laser radiation to be amplified being directed into the laser-active solid-state medium focused in a first plane of the orthogonal planes with a strong thermal lens and collimated in a second plane of the orthogonal planes with a weak thermal lens;
   said beam of laser radiation having a waist that is being created lying in the area of the thermal lens.

2. The laser amplifier according to claim 17, wherein an element focusing in the plane with a strong thermal lens is used for creating the beam waist which is arranged in the beam path of the laser radiation at a distance equivalent to its focal length to the location of the thermal lens.

3. The laser amplifier according to claim 2, further comprising:
   at least one laser diode array as the source of pump radiation;
   collimation and focusing optics for the collimation of the fast axis and for the focusing of the diode radiation into an elliptical pump focus to generate the thermal lens whose strength varies in orthogonal planes.

4. The laser amplifier according to claim 3, wherein an additional collimation of the slow axis is provided for the improvement of the beam quality of the laser diode array.

5. The laser amplifier according to claim 4, wherein a half-wave phase plate is provided for setting the polarization.

6. The laser amplifier according to claim 5, wherein the pump radiation and the laser radiation are directed into the laser-active solid-state medium through beam passage surfaces situated opposite to each other and wherein the beam passage surface for the pump radiation is highly reflective for the wavelength of the laser radiation; such that the laser radiation passes through the laser-active solid-state medium and the focusing element again after being reflected.

7. The laser amplifier according to claim 6, wherein an optical element is arranged in front of the input of the amplifier for the expansion of the beam in the plane with a weak thermal lens.

8. The laser amplifier according to claim 7, wherein a Galilean telescope with cylindrical lenses is used as the optical element.

9. The laser amplifier according to claim 7, wherein an anamorphotic prism pair is used as the optical element.

10. The laser amplifier according to claim 8, wherein at least one imaging element is provided in the beam path of the laser radiation on the output of the amplifier for the purpose of compensating the weak thermal lens.

11. The laser amplifier according to claim 10, wherein the imaging element is a cylindrical mirror constructed as a folding mirror arranged on the amplifier output.

12. The laser amplifier according to claim 10, wherein the imaging element is a spherical mirror constructed as a folding mirror arranged on the amplifier output.

13. The laser amplifier according to claim 10, wherein the imaging element is a convex cylindrical lens with a long focal length arranged in the beam path of the laser beam emerging from the laser-active solid-state medium.

14. The laser amplifier according to claim 10, wherein the imaging element is a spherical lens with a long focal length arranged in the beam path of the laser beam emerging from the laser-active solid-state medium.

15. The laser amplifier according to claim 11, wherein the laser-active solid-state medium is an $Nd:YVO_4$ crystal with a doping level of about 0.5%.

16. The laser amplifier according to claim 15, wherein the pump wavelength is in the range of 803 nm to 809 nm.

* * * * *